United States Patent
Kautzleben et al.

(10) Patent No.: US 7,703,024 B2
(45) Date of Patent: Apr. 20, 2010

(54) OBTAINING A GRAPHICAL USER INTERFACE TO ACCESS A REMOTE COMPUTING SYSTEM

(75) Inventors: Reinhold Kautzleben, Karlsruhe (DE); Holger Roesing, Karlsruhe (DE); Gregor K Frey, Lorsch (DE)

(73) Assignee: SAP AG, Walldorf (DE)

( * ) Notice: Subject to any disclaimer, the term of this patent is extended or adjusted under 35 U.S.C. 154(b) by 1124 days.

(21) Appl. No.: 10/931,438

(22) Filed: Aug. 31, 2004

(65) Prior Publication Data

US 2006/0048165 A1    Mar. 2, 2006

(51) Int. Cl.
*G06F 3/00* (2006.01)
*G06F 15/16* (2006.01)
*G06F 15/167* (2006.01)

(52) U.S. Cl. .................. 715/749; 715/733; 715/744; 715/747; 715/748; 715/750; 709/201; 709/202; 709/203; 709/217; 709/219

(58) Field of Classification Search .................. 715/733, 715/744, 747, 748, 749, 750, 764, 765; 719/329, 719/328, 203
See application file for complete search history.

(56) References Cited

U.S. PATENT DOCUMENTS

| | | | |
|---|---|---|---|
| 6,680,730 B1 * | 1/2004 | Shields et al. | 345/169 |
| 6,918,125 B1 * | 7/2005 | Skinner et al. | 719/329 |
| 7,081,904 B2 * | 7/2006 | Zoller et al. | 345/661 |
| 7,165,099 B2 * | 1/2007 | Sprigg et al. | 709/219 |
| 7,228,353 B1 * | 6/2007 | Franceschelli et al. | 709/229 |
| 2002/0038333 A1 * | 3/2002 | Evans et al. | 709/107 |
| 2002/0109718 A1 * | 8/2002 | Mansour et al. | 345/744 |
| 2002/0196276 A1 * | 12/2002 | Corl et al. | 345/744 |
| 2003/0061279 A1 * | 3/2003 | Llewellyn et al. | 709/203 |
| 2003/0074403 A1 * | 4/2003 | Harrow et al. | 709/203 |
| 2003/0105884 A1 * | 6/2003 | Upton | 709/318 |
| 2004/0015953 A1 * | 1/2004 | Vincent | 717/173 |
| 2004/0183827 A1 * | 9/2004 | Putterman et al. | 345/744 |
| 2004/0261071 A1 * | 12/2004 | Chuang et al. | 717/170 |
| 2005/0097082 A1 * | 5/2005 | Yan | 707/3 |
| 2005/0278641 A1 * | 12/2005 | Mansour et al. | 715/749 |
| 2007/0079238 A1 * | 4/2007 | Weinkauff | 715/700 |

OTHER PUBLICATIONS

T.T. Tay, Y. Feng, M.N. Wijeysundera, A Distributed Internet Caching System, Nov. 2000, pp. 624-633.*

* cited by examiner

*Primary Examiner*—Kieu Vu
*Assistant Examiner*—Yongjia Pan
(74) *Attorney, Agent, or Firm*—Blakely Sokoloff Taylor & Zafman

(57) ABSTRACT

Embodiments of the invention are generally directed to a system and method for a remote Graphical User Interface (GUI). In an embodiment, a local computing system requests access to a remote computing system. In response, the remote computing system provides connection information to identify an appropriate GUI for accessing the remote computing system. The local computing system forwards the connection information to another local computing system to obtain the identified GUI. In one embodiment, the local computing system automatically downloads the GUI and accesses the remote computing system with the GUI.

21 Claims, 7 Drawing Sheets

OBTAINING A GRAPHICAL USER INTERFACE TO ACCESS A REMOTE COMPUTING SYSTEM

TECHNICAL FIELD

Embodiments of the invention generally relate to the field of data processing systems and, more particularly, to a system and method for a remote graphical user interface.

BACKGROUND

Many businesses rely on computer networks to provide a number of core functions. For example, businesses provide access to their products and services through applications that are delivered over computer networks such as the Internet. Also, businesses rely on computer networks to electronically link facilities that are physically separated. The applications that run on these computer networks typically have a multi-tiered architecture. In those cases where the applications are delivered over the Internet they are commonly referred to as Web-based applications.

FIG. 1 is a block diagram of a distributed system 100. Distributed system 100 includes enterprise computing system 110 connected with client 120 through network 130. Enterprise computing system 110 includes application server 112 and database server 116. Application server 112 receives and processes input from a client (not shown) using, for example, business logic 114. Application server 112 typically includes a number of subcomponents including, for example, connectivity layer 140, presentation logic 142, business logic 114, and database interface 144. Connectivity layer 140 provides connections to one or more clients (not shown) using protocols such as the HyperText Transfer Protocol (HTTP), HTTP secured through the Secure Socket Layer, the Simple Object Access Protocol (SOAP), and the like. The HTTP protocol refers to any of the HTTP protocols including, for example, the protocol described in Request For Comments (RFC) 2616 entitled, "HyperText Transport Protocol—HTTP/1.1," June 1999 (hereinafter, the HTTP protocol). The SOAP protocol refers to any of the SOAP protocols including the one promulgated by the World Wide Consortium (W3C) entitled, "SOAP Version 1.1 Part 1: Messaging Framework and Part 2: Adjuncts," 24 Jun. 2003 (hereinafter, the SOAP protocol). The Secure Socket Layer protocol refers to any of the Secure Socket Layer protocols including, for example, the protocol entitled, "The SSL Protocol Ver. 3.0," Nov. 18, 1996 (the HTTPS protocol).

Presentation logic 142 generates a Graphical User Interface (GUI) using, for example, a markup language such as the Hyper Text Markup Language (HTML). Business logic 114 represents the core of the application, for example, the rules governing the underlying business process (or other functionality) provided by the application. The Java 2 Enterprise Edition Specification v1.3, published on Jul. 27, 2001 (the J2EE specification) defines an increasingly popular architecture for application server 112.

Client 120 is a remotely located computing device that accesses application server 112 using a standalone user interface 122. The term "standalone" refers to a user interface that accesses application server 112 independently of a Web browser. Standalone user interfaces are often used to provide a content rich environment to, for example, remotely administer application server 112. Typically, user interface 122 and/or application server 112 change over time. For example, various updates, service packages, application releases, etc. create distinct versions of user interface 122 and application server 112. Experience has shown that some versions of user interface 122 are not compatible some versions of application server 112. The risk that user interface 122 is not compatible with application server 112 is increased because both client-side and server-side software frequently changes over time.

One possible solution is to download the appropriate client (e.g., client 120) from computing system 110 as needed. This solution is typically inadequate, however, because of the length of time required to download the appropriate client. For example if client 120 is large and connection 132 is slow then the process of acquiring client 120 from computing system 110 is prohibitively slow.

SUMMARY OF THE INVENTION

Embodiments of the invention are generally directed to a system and method for a remote Graphical User Interface (GUI). In an embodiment, a local computing system requests access to a remote computing system. In response, the remote computing system provides connection information to identify an appropriate GUI for accessing the remote computing system. The local computing system forwards the connection information to another local computing system to obtain the identified GUI. In one embodiment, the local computing system automatically downloads the GUI from the other local computing system and accesses the remote computing system with the GUI.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to a system and method for a remote Graphical User Interface (GUI). In an embodiment, a local computing system requests access to a remote computing system. In response, the remote computing system provides connection information to identify an appropriate GUI for accessing the remote computing system. The local computing system forwards the connection information to another local computing system to obtain the identified GUI. In one embodiment, the local computing system automatically downloads the GUI and accesses the remote computing system with the GUI.

Figure 2:
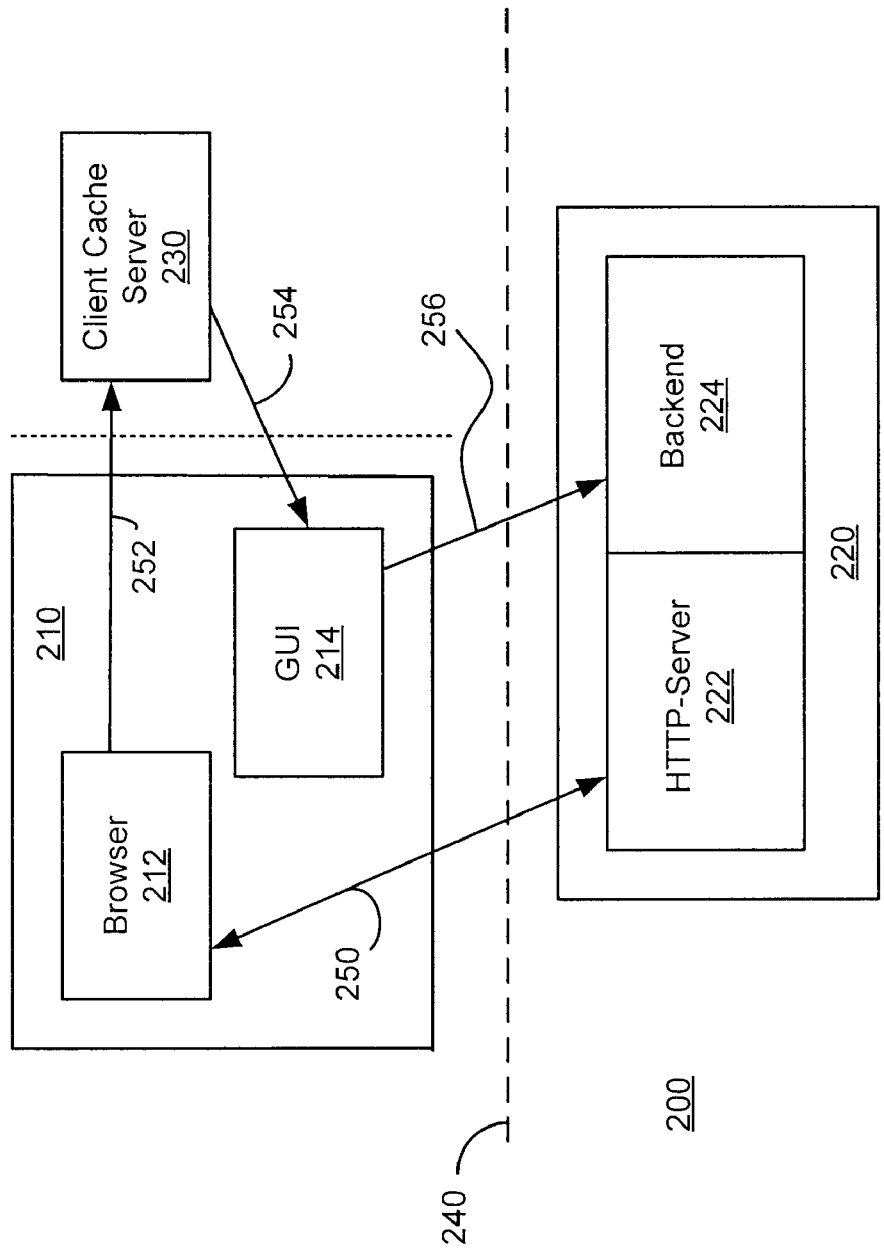
FIG. 2 is a block diagram of a distributed system implemented according to an embodiment of the invention.

FIG. 2 is a block diagram of distributed system 200 implemented according to an embodiment of the invention. Distributed system 200 includes local computing system 210, remote computing system 220, and client cache server 230. In an embodiment, local computing system 210 is a front-end system. That is, local computing system 210 is on the input side of distributed system 200. Dashed line 240 indicates that local computing system 210 is physically remote from remote computing system 220. As is further described below, local computing system 210 provides a mechanism for obtaining GUIs that are compatible with remote computing system 220 without the need to download the GUI over a slow connection (e.g., as represented by dashed line 240).

In an embodiment, remote computing system 220 is part of a multi-tiered network. The multi-tiered network may be implemented using a variety of different application technologies at each of the layers of the multi-tier architecture, including those based on the Java 2 Enterprise Edition™ ("J2EE") specification (e.g., the Websphere platform developed by IBM Corporation), the Microsoft .NET platform, and/or the Advanced Business Application Programming ("ABAP") platform developed by SAP AG. The J2EE specification refers to any of the J2EE specifications including, for example, the Java 2 Enterprise Edition Specification v1.3, published on Jul. 27, 2001.

Computing system 220 includes HTTP-server 222 and backend 224. The term "HTTP-server" refers to software that services HTTP messages. HTTP messages are messages that are formulated in accordance with one of the HTTP protocols, such as, the protocol described in Request For Comments (RFC) 2616 entitled, "HyperText Transport Protocol—HTTP/1.1," June 1999 (hereinafter, the HTTP protocol). In an alternative embodiment, HTTP-server 222 may be implemented to service messages formulated according to a different protocol such as HTTPS and/or SOAP.

Figure 1:
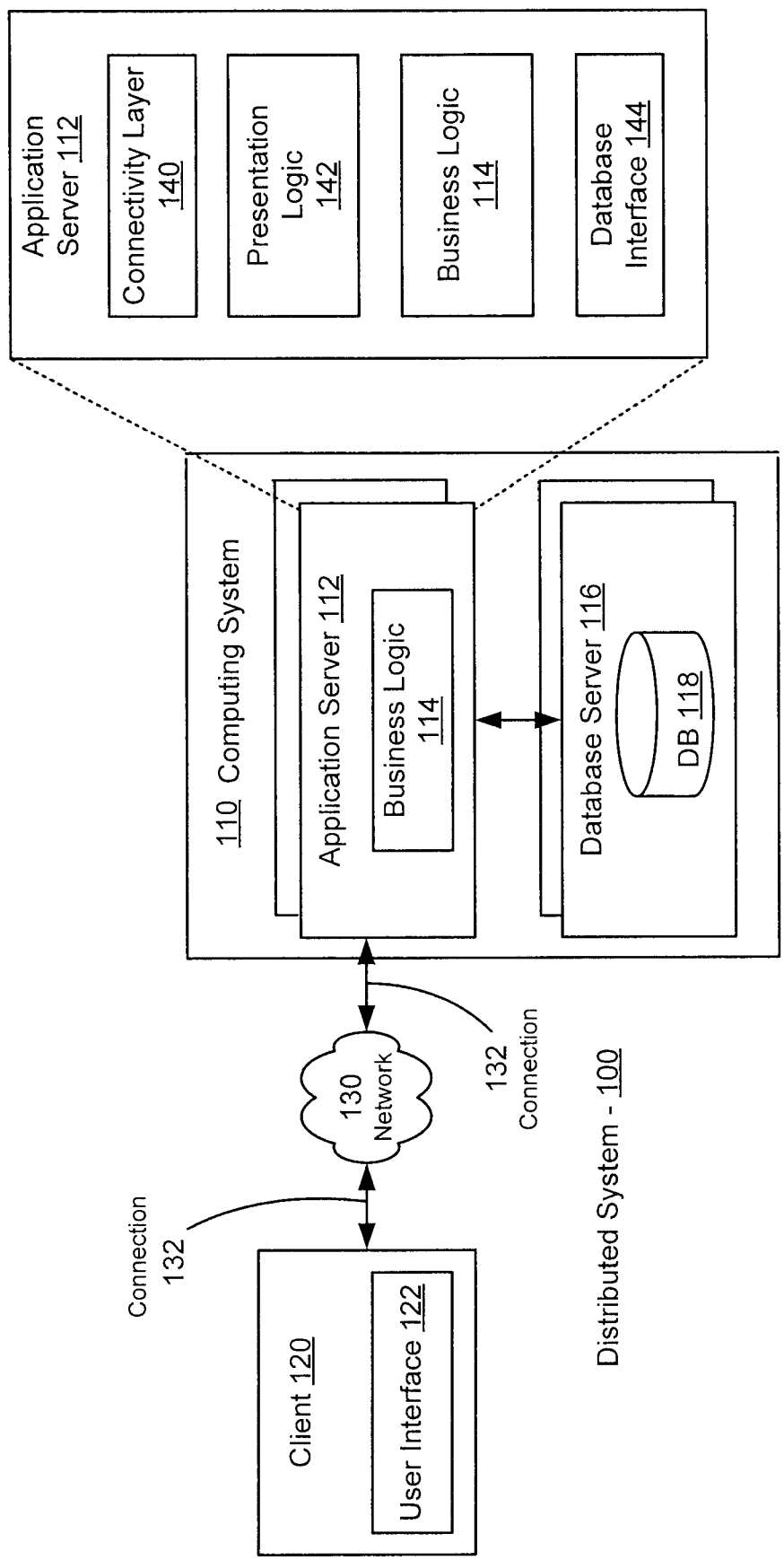
FIG. 1 is a block diagram of a distributed computing system.

In an embodiment, backend 224 is the backend of an enterprise computing system. The term "backend" refers to the portion of a multi-tiered network that processes and stores input from the front-end. In one embodiment, backend 224 includes an application server (e.g., application server 112, shown in FIG. 1) and a database server (e.g., database server 116, shown in FIG. 1). As is further described below, standalone clients may access backend 224 to perform various administrative functions.

Client cache server 230 provides a repository for one or more clients (e.g., client 120, shown in FIG. 1) and/or one or more versions of a client to access remote computing systems (e.g., remote computing system 220). In an embodiment, client cache server 230 is an HTTP-server. As is further described below, in an embodiment, the storage of and access to clients on server 230 is structured, at least in part, according to the Java™ Network Launching Protocol (JNLP). The JNLP refers to any of the Java Network Launching Protocols including the one described in Java Specification Request (JSR)—56 entitled, "Java Network Launching Protocol & Application Programming Interface Specification, Version 1.0.1." In such an embodiment, the term "JNLP-server" may be used to describe server 230. In an embodiment, client cache server 230 is connected to local computing system 210 over a fast connection such as a Local Area Network (LAN). Thus, from the perspective of local computing system 210, client cache server 230 is another local computing system.

In an embodiment, browser 212 queries HTTP-server 222 to determine the proper version of a client (e.g., GUI 214) to access backend 224 (as shown by reference number 250). In response, HTTP-server 222 responds with connection information to identify the appropriate version of the client to access backend 224. Browser 212 forwards the connection information to client cache server 230 as shown by 252. In an embodiment, client cache server 230 downloads GUI 214 over a fast connection (e.g., a LAN) as shown by 254.

GUI 214 then connects to backend 224 over connection 256. In an embodiment, connection 256 is a content rich connection. The term "content rich" refers to a connection that allows GUI 214 to exchange integers, arrays, and more complex objects (e.g., program code). In one embodiment, connection 256 supports Remote Method Invocation (RMI). The term "RMI" refers to a remote procedure call mechanism for distributed objects. In an alternative embodiment, connection 256 supports the Internet Inter-Object Request Broker Protocol (IIOP). The IIOP refers to any of the IIOP protocols such as RMI over IIOP, IIOP.Net, and the like.

In one embodiment, the appropriate GUI (e.g., GUI 214) is automatically obtained and opened in response to selecting a hyperlink displayed in browser 212. In such an embodiment, Java™ Web Start may be used, for example, to automatically deploy and launch GUI 214. The term "Java™ Web Start" refers to launching applications on a client system from resources hosted across a network using the JNLP.

Figure 3:
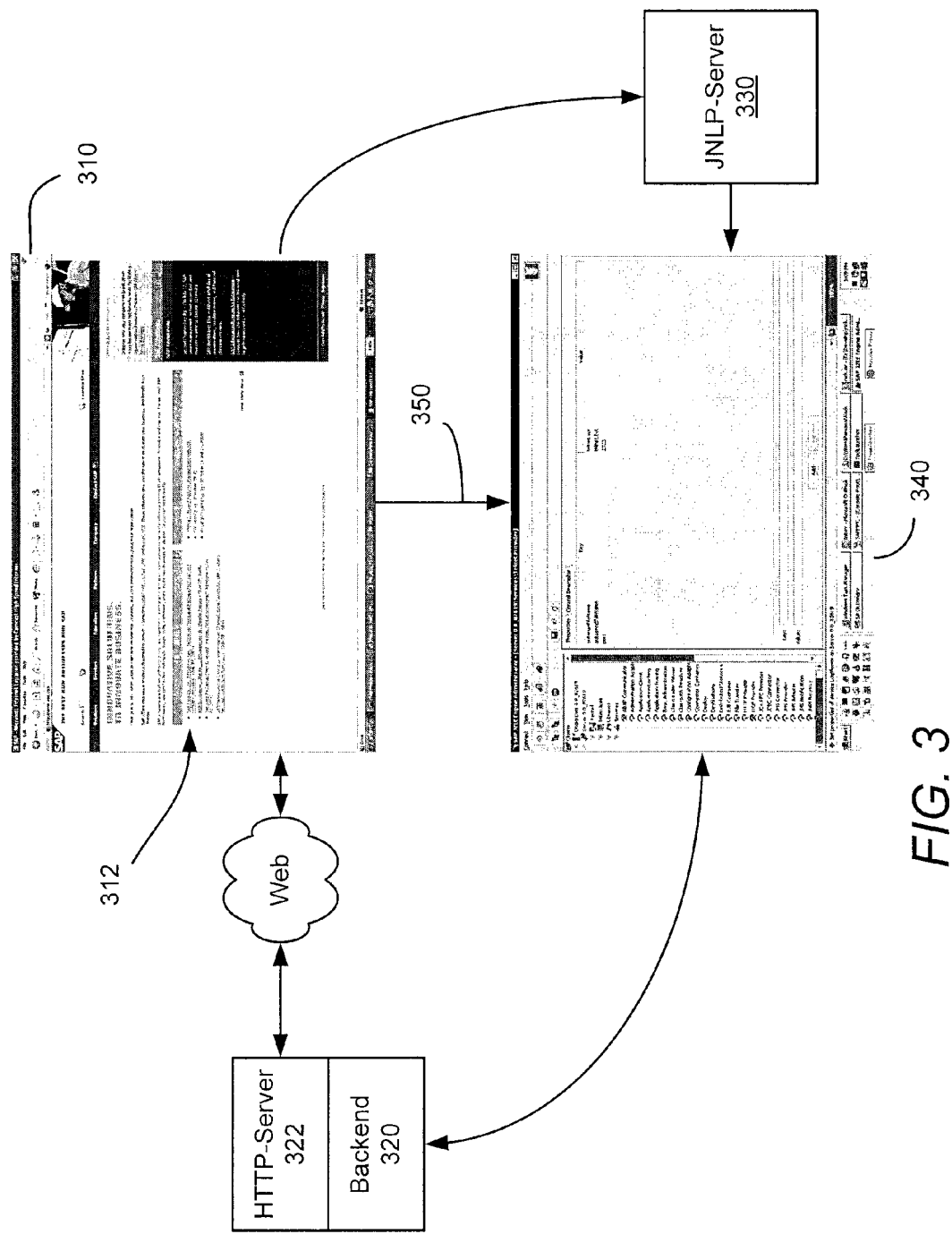
FIG. 3 illustrates the user experience according to an embodiment of the invention implemented with Java™ Web Start.

FIG. 3 illustrates the user experience according to an embodiment of the invention implemented with Java™ Web Start. A user selects hyperlink 312 in browser 310 to open an appropriate GUI for interacting with backend 320. In response, browser 310 queries HTTP-Server 322 to determine the identity (e.g., proper version) of the appropriate GUI. HTTP-server 322 provides an identifier (e.g., a version identifier) to specify the GUI. In response, browser 310 invokes Java™ Web Start to determine if all of the resources needed for GUI 340 are present on JNLP-server 330. If all of the resources are present, GUI 340 is opened and automatically connects to backend 320. From the user's perspective, however, GUI 340 automatically opens and connects to backend 320 responsive to selecting hyperlink 312 as shown by 350.

Figure 4:
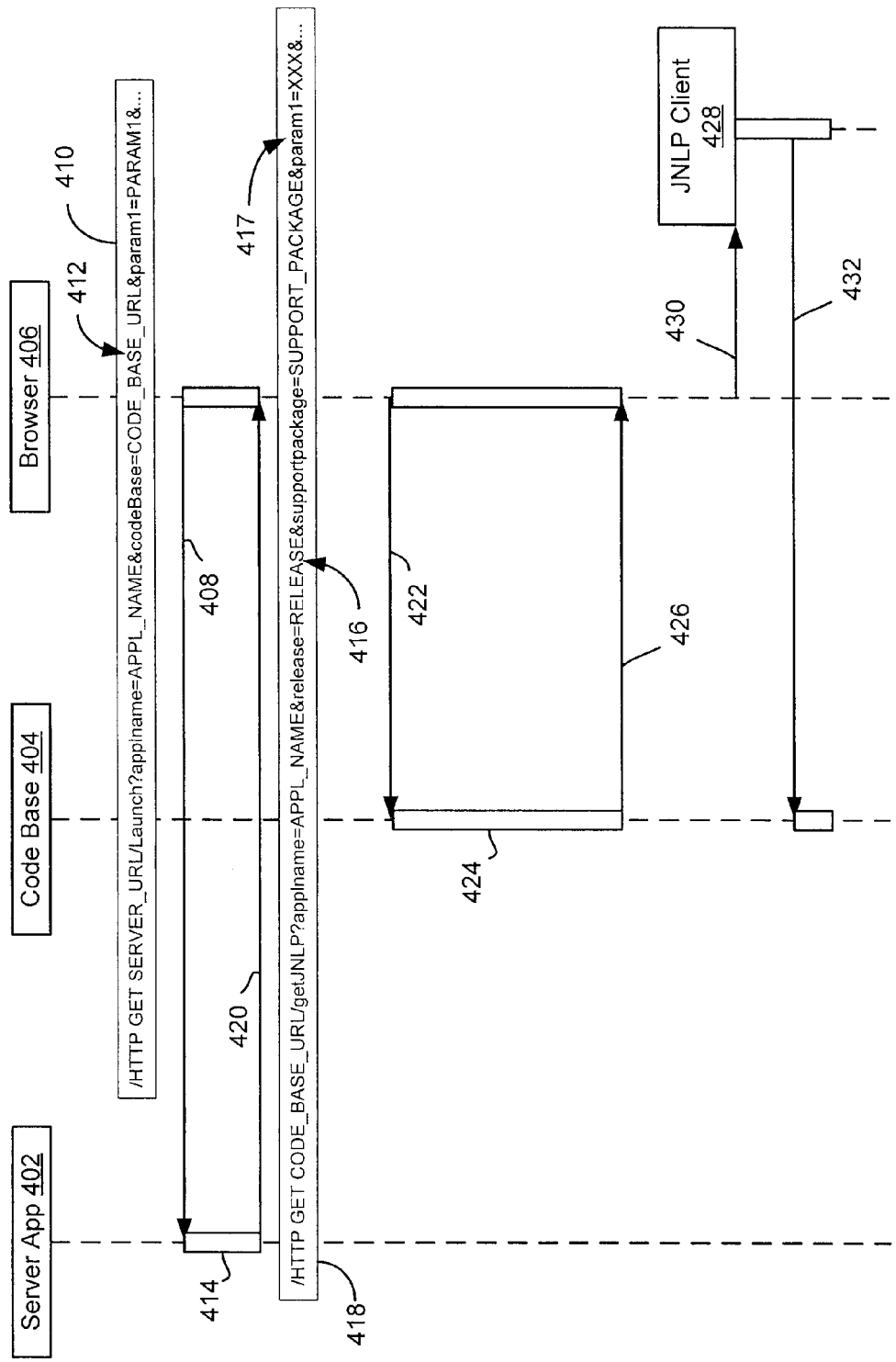
FIG. 4 illustrates selected interactions between elements of a distributed system implemented according to an embodiment of the invention.

FIG. 4 illustrates selected interactions between elements of a distributed system implemented according to an embodiment of the invention. The illustrated system includes server application 402, code base 404, and browser 406. Server application 402 is an application running on a remote server (e.g., HTTP-server 222 or backend 224, shown in FIG. 2). Code base 404 includes one or more clients (and/or versions of clients) stored in a client cache server (e.g., client cache server 230, shown in FIG. 2). Browser 406 is a browser running on a local computing device (e.g., local computing device 210, shown in FIG. 2).

In an embodiment, browser 406 requests access to the server on which server application 402 is running as shown by 408. In one embodiment, the request for access is a request to launch an appropriate GUI to interact with the server. HTTP message 410 illustrates one embodiment of a request to open the GUI. HTTP message 410 includes Uniform Resource Locator (URL) 412 to specify the location of a client cache server (e.g., client cache server 230, shown in FIG. 2).

Server application 402 receives HTTP message 410 and determines the proper GUI (and/or the proper version of the GUI) for accessing the server at 414. In an embodiment, server application 402 dynamically overwrites part of HTTP message 410 with an identifier 416 to specify the proper GUI and/or the proper version of the GUI for accessing the server. Server application 402 responds to browser 406 with HTTP message 418 as shown by 420.

In an embodiment, browser 406 launches Java™ Web Start after receiving HTTP message 418 and forwards identifier 416 to code base 404 as shown by 422. Code base 404 dynamically generates a JNLP file based, at least in part, on identifier 416 (and/or other elements of HTTP message 418 such as parameter 417) as shown by 424. The JNLP file describes the elements of the GUI (e.g., the Java™ Archive files (JARs), libraries, properties, etc.) so that a local computing system can download those elements from code base 404. An example of a JNLP file is further discussed below with reference to FIG. 5. Code base 404 provides the JNLP file to browser 406 as shown by 426.

After receiving the JNLP file, the local computing system launches JNLP client 428 as shown by 430. The term "JNLP client" refers to client-side software that parses a JNLP file, downloads an application (e.g., a GUI) based on the parsed JNLP file, and launches the downloaded application. JNLP client 428 downloads the GUI specified by the JNLP file at 432. In an embodiment, the GUI is automatically launched after it is downloaded. In one embodiment, the interaction described in FIG. 4 occurs automatically once a hyperlink is selected in browser 406. Thus, in one embodiment, the user's experience is simply that the appropriate GUI for interacting with a server is opened when a hyperlink is selected in a browser.

Figure 5:
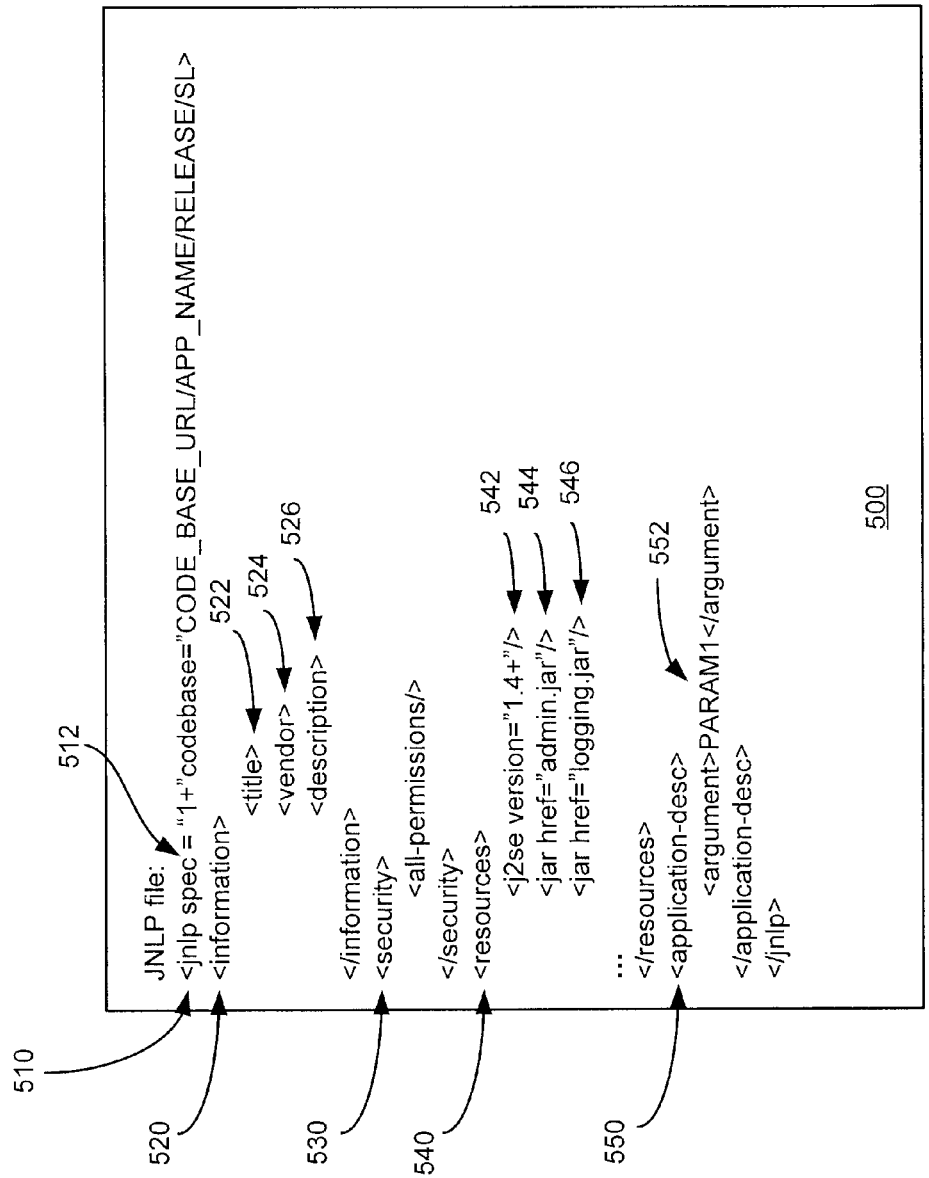
FIG. 5 illustrates an example of a Java™ Network Launching Protocol (JNLP) file according to an embodiment of the invention.

FIG. 5 illustrates an example of a JNLP file according to an embodiment of the invention. JNLP file 500 describes how to download and launch a particular client (e.g., GUI 340, shown in FIG. 3). The illustrated embodiment of JNLP file 500 is structured as an eXtensible Markup Language (XML) file. In an alternative embodiment, JNLP file 500 is structured according to a different language. The illustrated embodiment of JNLP file 500 has five main sections: JNLP element 510, information element 520, security element 530, resources element 540, and application description element 550.

JNLP element 510 is the root element of JNLP file 500 and may include one or more attributes that provide information that are specific to JNLP file 500. For example, spec attribute 512 specifies the version(s) of the JNLP specification that apply to JNLP file 500. The value "1+" indicates that JNLP file 500 works with a JNLP client (e.g., JNLP client 428) that supports version 1.0 of the JNLP specification or higher.

Information element 520 provides meta-information about the associated client (e.g., meta-information about GUI 340, shown in FIG. 3). In one embodiment, the information contained in information element 520 is displayed to a user while the associated client is downloaded. The illustrated embodiment includes title element 522, vendor element 524, and description element 526.

Security element 530 is used to request a restricted environment for a JNLP client (e.g., JNLP client 428, shown in FIG. 4). The term "restricted environment" refers to an environment that prevents applications from intentionally or unintentionally harming a local host. The JNLP protocol specifies restrictions to enforce in a restricted environment.

Resources element 540 specifies resources that are part of the associated application. Examples of types of resources include Java™ class files, native libraries, and system properties. The illustrated embodiment specifies the version of the Java Runtime Environment (JRE) that supports the associated application at 542. In addition, two JAR files that are part of the application's classpath are specified by 544 and 546.

Application description element 550 provides information used to launch the application. The application is launched using the static public void main (String[ ] argv) method on the main class of a resource specified in resource element 540 (e.g., JARs 544 and 546). The argv argument is constructed from parameter 552.

Figure 6:
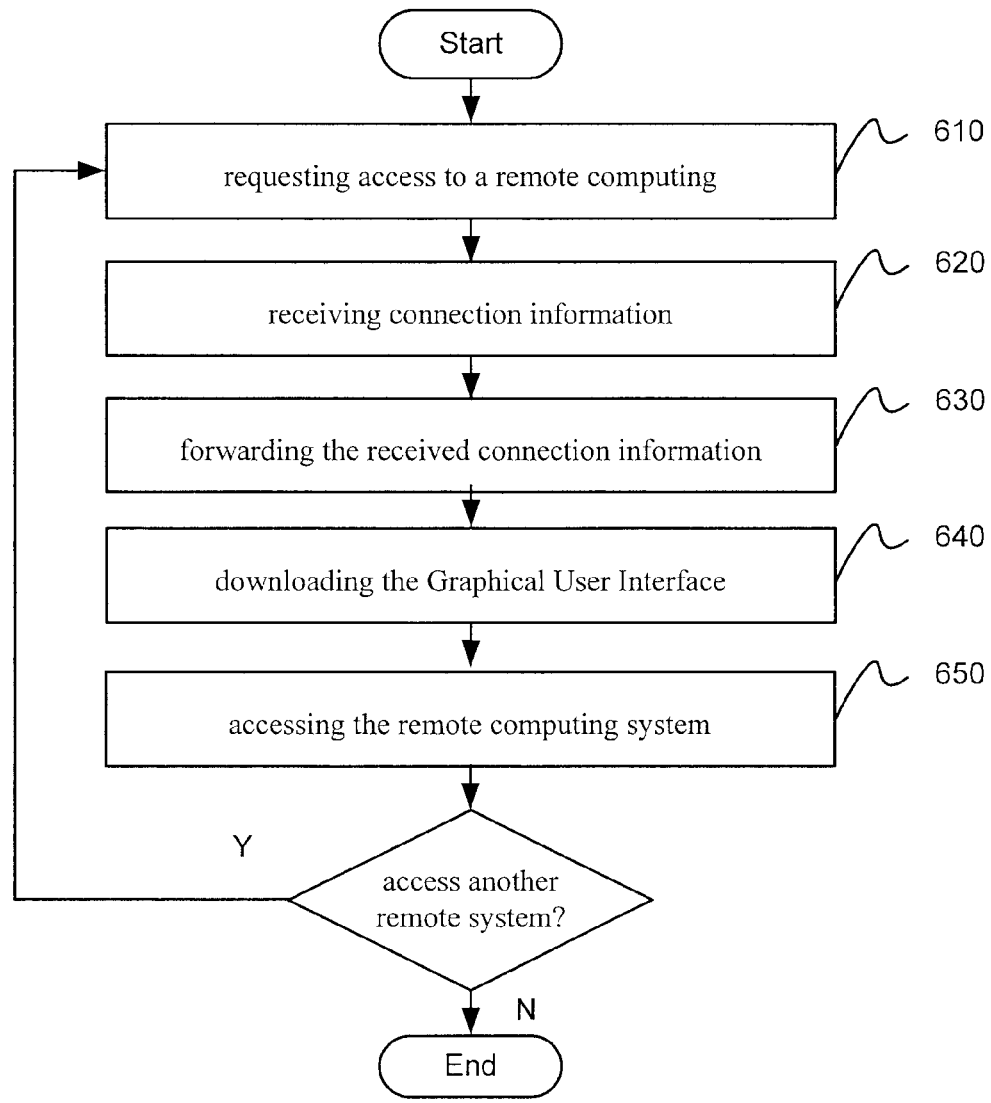
FIG. 6 is a flow diagram illustrating certain aspects of a method for connecting with a remote computing system, according to an embodiment of the invention.

Turning now to FIG. 6, the particular methods associated with embodiments of the invention are described in terms of computer software and hardware with reference to a flowchart. The methods to be performed by a computing device (e.g., an application server) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement embodiments of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 6 is a flow diagram illustrating certain aspects of a method for connecting with a remote computing system, according to an embodiment of the invention. Referring to process block 610, a local computing system (e.g., local computing system 210, shown in FIG. 2) requests access to a remote computing system (e.g., remote computing system 220, shown in FIG. 2). In an embodiment, "requesting access" includes requesting that the remote computing system open a standalone GUI.

In one embodiment, a browser running on the local computing system receives input indicating that a displayed hyperlink is selected. The term "receiving input" refers to receiving an indication from, for example, a pointing device, keyboard, touch screen, etc. that indicates the hyperlink is selected. The browser sends an HTTP message to the remote computing system to request that the standalone GUI be opened. In one embodiment, the HTTP message contains a Uniform Resource Indicator (URI) that specifies the location of a client cache server (e.g., client cache server 230, shown in FIG. 2).

Referring to process block 620, the local computing system receives connection information from the remote computing system. The term "connection information" refers to information used to obtain the GUI. Examples of connection information include (and are not limited to) a URL specifying the location of the GUI, a version indicator to specify an appropriate version of the GUI, a parameter used to call the GUI, and the like. In an embodiment, the remote computing system sends the local computing system the connection information in an HTTP message (e.g., HTTP message 418, shown in FIG. 4). The HTTP message may include a URL that specifies the location of the GUI, a version indicator to specify the proper version of the GUI (e.g., version indicator 416, shown in FIG. 4), and/or a parameter with which to launch the GUI (e.g., parameter 417, shown in FIG. 4). In one embodiment, a server application (e.g., server application 402, shown in FIG. 4) automatically sends an HTTP response message containing the connection information in response to receiving an HTTP request message to open the GUI from the local computing system.

Referring to process block 630, the local computing system forwards the received connection information to another local computing system to obtain the GUI from the other local computing system. In an embodiment, the other local computing system is a client cache server (e.g., client cache server 230, shown in FIG. 2) that is connected to the local computing system via a LAN (or other fast connection). In such an embodiment, forwarding the received connection information includes sending the HTTP message that was received from the remote computing system to the client cache server. In an embodiment, the client cache server provides a JNLP file (e.g., JNLP file 500, shown in FIG. 5) to the local computing system in response to receiving the forwarded connection information.

Referring to process block 640, the local computing system downloads the GUI from, for example, the client cache server. In one embodiment, Java™ Web Start is used to store, update, and open, the GUI. In such an embodiment, the local computing system downloads the GUI based, at least in part, on the JNLP file received from the client cache server. For example, the local computing system identifies the resources that form the GUI (e.g., as specified in resources element 540, shown in FIG. 5) and downloads the identified resources. In one embodiment, the local computing system automatically downloads the GUI in response to receiving the JNLP file.

Referring to process block 650, the local computing system accesses the remote computing system with the GUI. The term "accessing" the remote computing system refers to, for example, invoking a method of an object on the remote computing system, exchanging information with a process running on the remote computing system, and the like. In one embodiment, the GUI is automatically started (e.g., using Java™ Web Start) after the GUI is downloaded. Similarly, in an embodiment, the GUI automatically connects with the remote system after it starts.

In one embodiment, the process described in FIG. 6 proceeds automatically in response to a user selecting a hyperlink displayed in browser. From the user's perspective, an appropriate GUI opens and connects with the remote computing system in response to selecting the hyperlink. In an alternative embodiment, the user experience may include providing additional input and/or different input.

Figure 7:
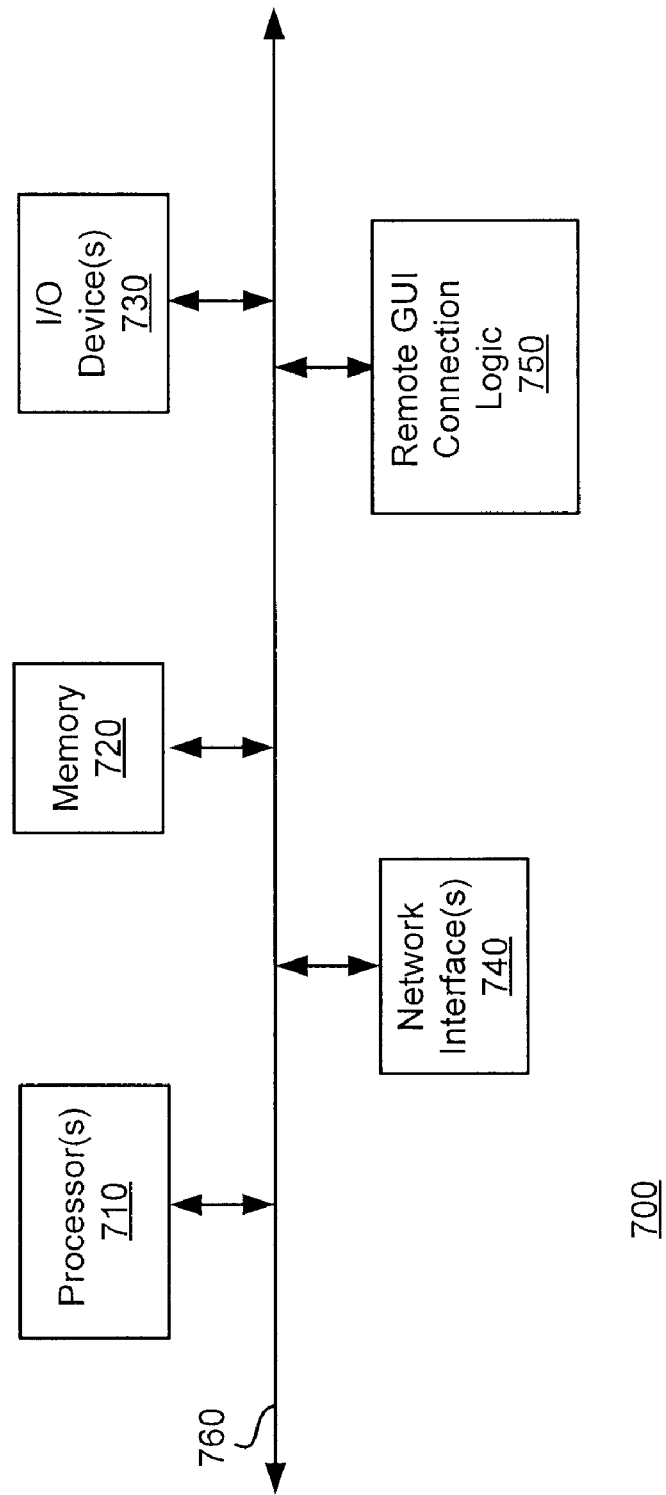
FIG. 7 is a block diagram of a node implemented according to an embodiment of the invention.

FIG. 7 is a block diagram of node 700 implemented according to an embodiment of the invention. Node 700 may include: processor(s) 710, memory 720, one or more Input/Output devices 730, network interface(s) 740. The illustrated elements may be connected together through system interconnection 760. Processor(s) 710 may include a microprocessor, microcontroller, field programmable gate array (FPGA), application specific integrated circuit (ASIC), central processing unit (CPU), programmable logic device (PLD), and similar devices that access instructions from system storage (e.g., memory 720), decode them, and execute those instructions by performing arithmetic and logical operations.

Remote GUI connection logic 750 enables node 700 to identify, download, and launch an appropriate standalone GUI to access a remote computing system. Remote GUI connection logic 750 may be executable content, control logic (e.g., ASIC, PLD, FPGA, etc.), firmware, or some combination thereof, in an embodiment of the invention. In embodiments of the invention in which remote GUI connection logic 750 is executable content, it may be stored in memory 720 and executed by processor(s) 710.

Memory 720 may encompass a wide variety of memory devices including read-only memory (ROM), erasable programmable read-only memory (EPROM), electrically erasable programmable read-only memory (EEPROM), random access memory (RAM), non-volatile random access memory (NVRAM), cache memory, flash memory, and other memory devices. Memory 720 may also include one or more hard disks, floppy disks, ZIP disks, compact disks (e.g., CD-ROM), digital versatile/video disks (DVD), magnetic random access memory (MRAM) devices, and other system-readable media that store instructions and/or data. Memory 720 may store program modules such as routines, programs, objects, images, data structures, program data, and other program modules that perform particular tasks or implement particular abstract data types that facilitate system use.

One or more I/O devices 730 may include a hard disk drive interface, a magnetic disk drive interface, an optical drive interface, a parallel port, serial controller or super I/O controller, serial port, universal serial bus (USB) port, a display device interface (e.g., video adapter), a network interface card (NIC), a sound card, modem, and the like. System interconnection 760 permits communication between the various elements of node 700. System interconnection 760 may include a wide variety of signal lines including one or more of a memory bus, peripheral bus, local bus, host bus, bridge, optical, electrical, acoustical, and other propagated signal lines.

Elements of embodiments of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, or other type of machine-readable media suitable for storing electronic instructions.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A computer-implemented method comprising:
    requesting access to a remote computing system from a local computing system, the remote computing system having a message server to service messages formulated according to a messaging protocol, wherein requesting access includes querying the message server of the remote computing system to identify and obtain a Graphical User Interface (GUI) with which to access the remote computing system, the querying including sending a message to the message server of the remote computing system, the message including a location indicator to specify a location of another local computing system from which the local computer system can download the identified GUI using a fast connection;

receiving in the local computing system connection information from the message server of the remote computing system responsive to requesting access, the received connection information to identify and instruct how to obtain the GUI with which to access the remote computing system, the receiving including receiving a return of the message from the message server, the message server having overwritten a GUI version indicator into the message to specify a version of the identified GUI for accessing the remote computing system;

forwarding the received connection information from the local computing system to the other local computing system from which the identified GUI can be downloaded to the local computing system using the fast connection, based, at least in part, on the received connection information to identify and instruct how to obtain the GUI, the forwarding including sending to the other local computing system the returned message containing the GUI version indicator using the location indicator included in the message, the location indicator specifying the location of the other local computing system, the other local computing system having a code base for generating a file describing the identified GUI based, at least in part, on the returned message;

receiving from the other local computing system a Java Network Launching Protocol (JNLP) file describing the identified GUI corresponding to the GUI version indicator, wherein the code base for generating the file generates the JNLP file;

downloading the identified GUI to the local computing system from the other local computing system using the fast connection, the downloading based, at least in part, on the received connection information to identify and instruct how to obtain the identified GUI; and accessing the remote computing system via the identified GUI.

2. The computer-implemented method of claim 1, wherein requesting access to the remote computing system further comprises:
receiving input selecting a hyperlink displayed in a browser of the local computer system, the hyperlink representing the remote computing system.

3. The computer-implemented method of claim 1, wherein downloading the identified GUI to the local computing system from the other local computing system comprises:
downloading the identified GUI to the local computing system from the other local computing system based, at least in part, on the JNLP file describing the identified GUI.

4. The computer-implemented method of claim 1, wherein accessing the remote computing system via the identified GUI comprises:
starting the identified GUI; and
automatically connecting to the remote computing system responsive to starting the identified GUI.

5. An apparatus comprising:
a local computing system;
a remote computing system having a message server to service messages formulated according to a messaging protocol;
a network interface to provide a connection with the remote computing system; and
a processor and logic executable thereon to
request access to the remote computing system from the local computing system;
query the message server of the remote computing system from the local computing system to identify and obtain a Graphical User interface (GUI) with which to access the remote computing system, wherein to query the message server is to send a message to the message server of the remote computing system, the message including a location indicator to specify a location of a client cache server with which the local computing system has a fast connection, and from which the local computer system can download the identified GUI using the fast connection;

receive connection information from the message server of the remote computing system, responsive to requesting access, the received connection information to identify and instruct how to obtain the GUI with which to access the remote computing system, wherein to receive connection information is to receive an automatically generated message from the remote computing system, the automatically generated message containing the message that was sent to the message server of the remote computing system, the automatically generated message being overwritten with the connection information, the connection information including a GUI version identifier to specify a version of the identified GUI;

forward the received connection information from the local computing system to a client cache server with which the local computing system has a fast connection, based, at least in part, on the received connection information to identify and instruct how to obtain the GUI, wherein to forward the received connection information is to send the automatically generated message containing the connection information including the GUI version indicator to the client cache server using the location indicator specifying the location of the client cache server, the client cache server having a code base for generating a file describing the identified GUI based, at least in part, on the automatically generated message;

receive a Java Network Launching Protocol (JNLP) file describing the identified GUI corresponding to the GUI version indicator from the client cache server, wherein the code base for generating the file generates the JNLP file;

download the GUI to the local computing system from the client cache server using the fast connection, the download based, at least in part, on the received connection information to identify and instruct how to obtain the GUI; and access the remote computing system via the identified GUI.

6. The apparatus of claim 5, wherein the logic executable thereon further comprises logic to:
receive input selecting a hyperlink displayed in a browser of the local computer system, the hyperlink representing access to the remote computing system.

7. The apparatus of claim 5, wherein the logic executable thereon to download the identified GUI to the local computing system from the client cache server comprises logic to:
automatically download the identified GUI to the local computing system from the client cache server based, at least in part, on the JNLP file describing the identified GUI;
start the identified GUI; and
connect to the remote computing system, responsive to starting the identified GUI.

8. A computer-implemented system comprising:
input means for requesting access to a remote computing system from a local computing system, the remote computing system having a message server means to services messages formulated according to a messaging protocol, wherein the input means for requesting access includes means for querying the message server of the remote computing system to identify and obtain a Graphical User Interface (GUI) means with which to access the remote computing system, wherein the means for querying the message server includes means for sending a message to the message server means of the remote computing system, the message including a location indicator to specify a location of the other local computing system having the fast connection to the local computing system;

communication means for receiving connection information from the message server means of the remote computing system, responsive to requesting access, the received connection information to identify and instruct how to obtain the GUI means with which to access the remote computing system, wherein the communication means for receiving connection information includes means for receiving an automatically generated message from the message server means of the remote computing system, the automatically generated message containing the message that was sent to the message server means, the automatically generated message being overwritten with connection information, the connection information including a GUI version indicator to specify a version of the identified GUI for accessing the remote computing system;

communication means for forwarding the received connection information from the local computing system to another local computing system having a fast connection means to the local computing system, based, at least in part, on the received connection information to identify and instruct how to obtain the GUI, wherein the communication means for forwarding includes means for sending the automatically generated message containing the connection information including the GUI version indicator to the other local computing system using the location indicator specifying the location of the other local computing system, the other local computing system having a code base means for generating a file describing the identified GUI based, at least in part, on the automatically generated message;

communication means for receiving a Java Network Launching Protocol (JNLP) file describing the identified GUI corresponding to the GUI version indicator from the other local computing system, wherein the code base means for generating the file generates the JNLP file;

communication means for downloading the identified GUI means to the local computing system from the other local computing system over the fast connection based, at least in part, on the received connection information to identify and instruct how to obtain the GUI; and processor means for accessing the remote computing system via the identified GUI means.

9. The computer-implemented system of claim 8, wherein the input means for requesting access to the remote computing system from the local computing system comprises:

input means for receiving input selecting a hyperlink displayed in a browser of the local computer system, the hyperlink representing an application hosted on the remote computing system.

10. The computer-implemented system of claim 8, wherein the communication means for downloading the GUI to the local computing system from the other local computing system comprises:

processor means for automatically downloading the identified GUI to the local computing system from the other local computing system using the fast connection based, at least in part, on the JNLP file describing the identified GUI.

11. The computer-implemented system of claim 8, wherein the processor means for accessing the remote computing system with the identified GUI comprises:

means for starting the identified GUI; and means for automatically connecting to the remote computing system, responsive to starting the identified GUI.

12. An article of manufacture comprising:

an electronically accessible storage medium providing instructions that, when executed by an apparatus, cause the apparatus to request access to a remote computing system from a local computing system, the remote computing system having a message server to service messages formulated according to a messaging protocol, wherein requesting access includes querying the message server of the remote computing system to identify and obtain a Graphical User Interface (GUI) with which to access the remote computing system;

receive connection information from the message server of the remote computing system responsive to requesting access, the received connection information to identify and instruct how to obtain the GUI with which to access the remote computing system;

forward the received connection information from the local computing system to a code base server having a code base for generating a file describing the identified GUI, based, at least in part, on the received connection information to identify and instruct how to obtain the identified GUI;

receive input selecting a hyperlink displayed in a browser of the local computer system, the hyperlink representing an application on the remote computing system that is accessible via the identified GUI;

send a HyperText Transfer Protocol (HTTP) message to the message server of the remote computing system, the HTTP message including a Uniform Resource Indicator (URI) to specify a location of the code base server;

receive a return of the HTTP message, the message server having overwritten a GUI version indicator into the returned message to specify a version of the identified GUI for accessing the remote computing system;

send the returned HTTP message containing the GUI version indicator to the code base server using the URI in the HTTP message specifying the location of the code base server;

receive a Java Network Launching Protocol (JNLP) file describing the identified GUI corresponding to the GUI version indicator from the code base server, wherein the code base for generating the file generates the JNLP file;

download the identified GUI to the local computing system from the code base server based, at least in part, on the received connection information to identify and instruct how to obtain the identified GUI; and access the remote computing system via the identified GUI.

13. The article of manufacture of claim 12, wherein the instructions that, when executed by the apparatus, cause the apparatus to download the identified GUI to the local computing system from the code base server further cause the apparatus to:

download the identified GUI to the local computing system from the code base server based, at least in part, on the generated JNLP file describing the identified GUI.

14. The article of manufacture of claim 12, wherein the instructions that, when executed by the apparatus, cause the apparatus to access the remote computing system with the identified GUI, further cause the apparatus to:
start the identified GUI; and
automatically connect to the remote computing system, responsive to starting the identified GUI.

15. The computer-implemented method of claim 1, wherein the message server is one of a HyperText Transfer Protocol (HTTP) server that services messages formulated according to an HTTP message protocol, a HyperText Transfer Protocol over Secure Socket Layer (HTTPS) server that services messages formulated according to an HTTPS message protocol, and a SOAP server that services messages formulated according to a SOAP protocol.

16. The apparatus of claim 5, wherein the message server is one of a HyperText Transfer Protocol (HTTP) server that services messages formulated according to an HTTP message protocol, a HyperText Transfer Protocol over Secure Socket Layer (HTTPS) server that services messages formulated according to an HTTPS message protocol, and a SOAP server that services messages formulated according to a SOAP protocol.

17. The system of claim 8, wherein the message server means is one of a HyperText Transfer Protocol (HTTP) server that services messages formulated according to an HTTP message protocol, a HyperText Transfer Protocol over Secure Socket Layer (HTTPS) server that services messages formulated according to an HTTPS message protocol, and a SOAP server that services messages formulated according to a SOAP protocol.

18. The computer-implemented method of claim 1, wherein the received connection information to identify and instruct how to obtain the GUI with which to access the remote computing system includes at least one of a URL specifying the location of the GUI, a version indicator to specify an appropriate version of the GUI, and a parameter used to call the GUI.

19. The apparatus of claim 5, wherein the received connection information to identify and instruct how to obtain the GUI with which to access the remote computing system includes at least one of a URL specifying the location of the GUI, a version indicator to specify an appropriate version of the GUI, and a parameter used to call the GUI.

20. The system of claim 8, wherein the received connection information to identify and instruct how to obtain the GUI with which to access the remote computing system includes at least one of a URL specifying the location of the GUI, a version indicator to specify an appropriate version of the GUI, and a parameter used to call the GUI.

21. The article of manufacture of claim 12, wherein the received connection information to identify and instruct how to obtain the GUI with which to access the remote computing system includes at least one of a URL specifying the location of the GUI, a version indicator to specify an appropriate version of the GUI, and a parameter used to call the GUI.

* * * * *